(12) United States Patent
Dieterich et al.

(10) Patent No.: US 6,208,643 B1
(45) Date of Patent: Mar. 27, 2001

(54) APPARATUS AND METHOD FOR ANALYZING BITSTREAMS

(75) Inventors: Charles B. Dieterich, Kingston, NJ (US); Ragnar H. Jonsson, Skagastrond (IS)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 08/948,800

(22) Filed: Oct. 10, 1997

Related U.S. Application Data (60) Provisional application No. 60/027,938, filed on Oct. 11, 1996, and provisional application No. 60/028,369, filed on Oct. 15, 1996.

(51) Int. Cl.[7] ................................................. H04L 12/28
(52) U.S. Cl. ........................ 370/389; 370/464; 370/516; 375/230.1
(58) Field of Search ..................................... 370/389, 412, 370/428, 468, 396, 473, 229, 230, 231, 232, 233, 234, 235, 503, 506, 507, 512, 513, 514, 516, 464, 249; 382/233; 375/230.1, 230.2, 142

(56) References Cited

U.S. PATENT DOCUMENTS

| | | | | |
|---|---|---|---|---|
| 4,675,862 | * | 6/1987 | Banzi, Jr. et al. | 370/249 |
| 5,051,742 | * | 9/1991 | Hullett et al. | 370/412 |
| 5,313,454 | | 5/1994 | Bustini et al. | 370/13 |
| 5,535,193 | | 7/1996 | Zhang et al. | 370/17 |
| 5,590,116 | * | 12/1996 | Zhang | 370/253 |
| 5,640,388 | | 6/1997 | Woodhead et al. | 370/468 |
| 5,659,634 | * | 8/1997 | Yeh et al. | 382/233 |
| 5,764,626 | * | 6/1998 | VanDervort | 370/232 |
| 5,805,602 | * | 9/1998 | Cloutier et al. | 370/516 |
| 5,838,678 | * | 11/1998 | Davis et al. | 370/389 |
| 5,898,695 | * | 4/1999 | Fujii et al. | 370/464 |

* cited by examiner

Primary Examiner—Wellington Chin
Assistant Examiner—Prenell Jones
(74) Attorney, Agent, or Firm—William J. Burke (57) ABSTRACT

A bitstream analyzer for detecting and verifying errors in the bitstream such as inconsistencies of time base and program specific information in real time is disclosed. Frequency tracking is provided with only a single time reference, by tracking the time of reception of various time-elements.

28 Claims, 9 Drawing Sheets

APPARATUS AND METHOD FOR ANALYZING BITSTREAMS

This application claims the benefit of U.S. Provisional Application No. 60/027,938 filed Oct. 11, 1996 and U.S. Provisional Application No. 60/028,369 filed Oct. 15, 1996.

The present invention relates to an apparatus and concomitant method for measuring the parameters of received digital bitstreams. More particularly, this invention relates to an apparatus and method that evaluates bitstreams in "real time" to verify various time-elements in the bitstreams.

BACKGROUND OF THE INVENTION

The increasing demand for digital video/audio information presents an ever increasing problem of monitoring the transmission or storage of data in data communication. As the transmission bandwidth increases in response to greater demand, it becomes increasingly more difficult to monitor the enormous amount of transmitted information in real time.

Generally, the data streams (bitstreams) contain various data elements that include video, audio, timing, program specific information and control data which are packaged into various "packets". A packet is a group of binary digits that include various data elements which are switched and transmitted as a composite whole. The data elements and other information are arranged in accordance with various specific formats, e.g., ISO/IEC international Standards 11172-* (MPEG-1), 13818-* (MPEG-2), ATSC standards and Digital Video Broadcasting (DVB) specification prETS 300–468, which are incorporated herein in their entirety by reference. In general, MPEG defines a packet as consisting of a header followed by a number of contiguous bytes from an "elementary data stream". An elementary stream is simply a generic term for one of the coded video, coded audio or other coded bitstreams. More specifically, a MPEG-2 "transport stream" packet comprises a header, which may be four (4) or more bytes long with a payload having a maximum length of 184 bytes. Transport stream packets are part of one or more programs which are assembled into a transport stream. The transport stream is then transmitted over a channel with a particular transfer rate.

Important components in the transport stream include various time-elements, i.e., Program Clock Reference (PCR) data and descriptive data called Program Specific Information (PSI). It should be noted that MPEG-2 allows a separate information system to be employed with the PSI, e.g., the Service Information (SI) in accordance with the DVB specification. In brief, the PCR is a time stamp encoding the timing of the bitstream itself and is used to derive the decoder timing, where the SI provides information to the decoder concerning the array of services that are offered. The SI allows a decoder to tune automatically to particular services and allows services to be grouped into categories with relevant schedule information.

Thus, it is important to monitor and verify that these time-elements and program specific information are received properly and that they are within the constraints defined by the relevant standards. Furthermore, it is important to alert the decoding system in real time if these time-elements and program specific information are outside of the allowed tolerances. Detection of such deviations allows the decoding system to account for packet framing errors, jitters, inconsistent time base information or network wide errors that may affect a plurality of channels. Although it may be more cost effective to capture the data in the transport stream into storage and then analyze the data at a later time, the benefit of real time analysis is lost.

With respect to PCR processing, although the set of specifications 13818 contain two very general descriptions of jitter measurement, in Annex D of part one and part nine of the systems specification, these two methods leave many parameters up to the discretion of the user, contain some imperfections and are impractical in-real-time applications.

Therefore, a need exists in the art for a method and apparatus for performing real time bitstream analysis. Specifically, a need exists for a method and apparatus for detecting and verifying errors in the bitstream such as inconsistencies of time base and program specific information.

SUMMARY OF THE INVENTION

The present invention is a bitstream analyzer for detecting and verifying errors in the bitstream such as inconsistencies of time base and program specific information in real time. The present invention is premised on the fact that it is impractical to provide numerous voltage controlled oscillators in a bitstream analyzer. For example, if the present bitstream analyzer must monitor 250 PIDs (each having its own PCRs) then 250 voltage controlled oscillators must be deployed to track their frequencies.

In the present invention, frequency tracking is provided with only a single time reference, which can be, preferably, an internal 27 MHz oscillator or an external 27 MHz TTL input. Since continuous measurement of time in any PID's timebase is not required, the present invention tracks only the time of reception of the PCR and packets of that particular PID. The present invention creates individual "System Time Clocks" (STCs), which keep track of what the System Time Clock would be if a decoder were using the PCRs transmitted on any particular PID.

The time of reception of a PCR is measured using a 27 MHz internal reference counter. The time of reception is measured within 1 cycle of 27 MHz. The specification of 188 byte or 204 byte mode on the input is used in the calculation of the reception time. The measurement is actually the start-of-packet arrival time. The arrival of the PCR is calculated based on the arrival of the PCR's packet and the arrival time of the packet following that packet. The PCR arrival time is interpolated between these two values using the knowledge of which byte holds the PCR and the number of bytes between the two start-of-packet times.

The calculated time of reception of PCR n is defined as tPCR(n). This value is used to update the PID's System Time Clock (STC) when a PCR is received. The STC is modified by a factor "$f_{pid}$", as defined below. Thus, the new STC at the time of reception of PCR(n) should be updated from it's previous value by the measured time interval corrected for frequency, or:

$$STC(n)=STC(n-1)+(tPCR(n)-tPCR(n-1))*(1+f_{pid}).$$

When the System Time Clock is not set (STC(n−1) is undefined), or when the calculated value of STC(n) is very different from the PCR(n), the STC is loaded with the PCR value. If this is not a known discontinuity, an error message is issued.

In one embodiment, all events where (tPCR(n)−tPCR(n−1))>0.1 seconds are treated as discontinuities, causing an error message and reload of the STC with the received PCR value.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
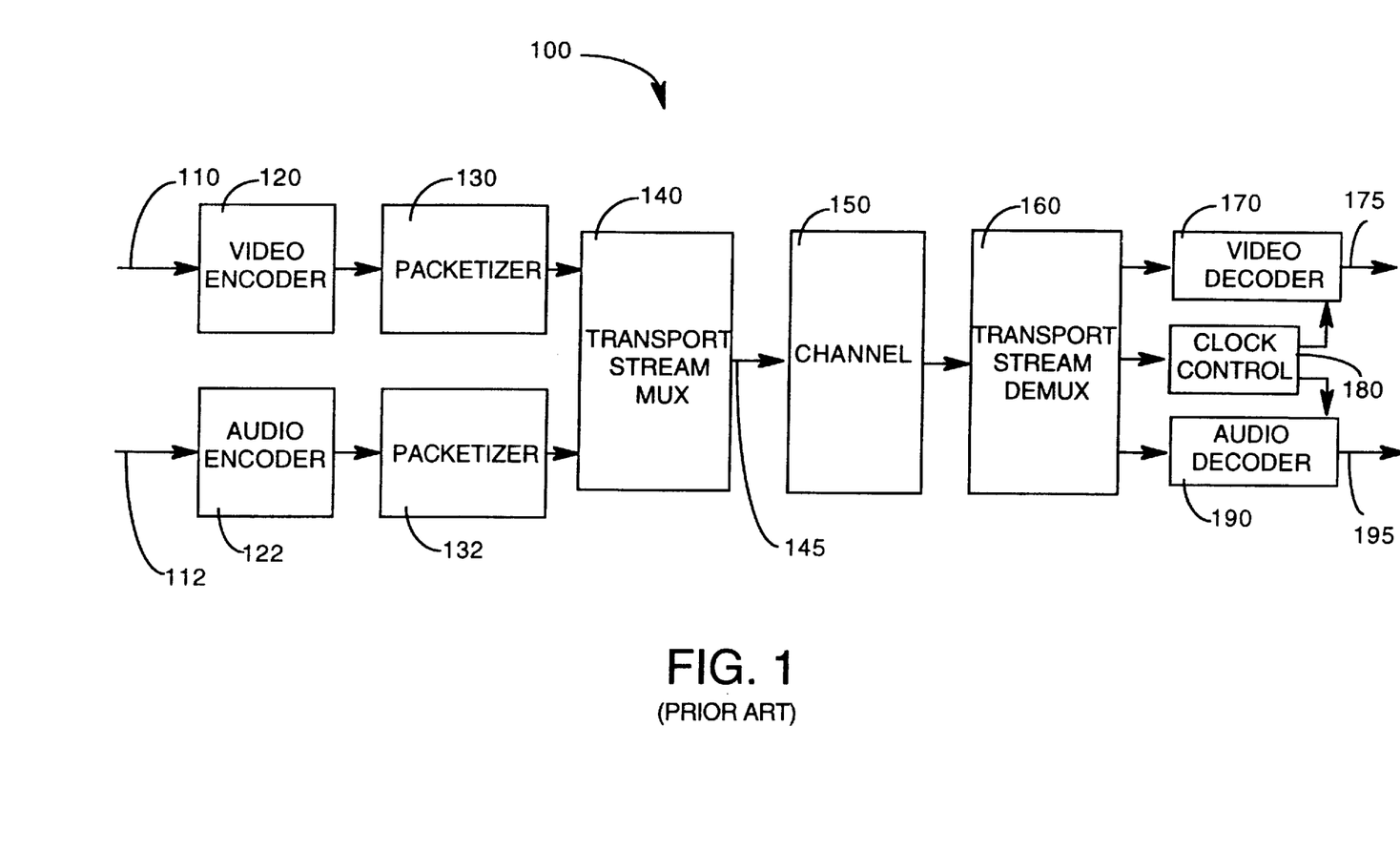
FIG. 1 illustrates a block diagram of a simplified conventional packet stream system.

FIG. 1 depicts a block diagram of a simplified structure of a conventional packet stream system 100. More specifically, a "transport stream" as defined in accordance with the MPEG standards is used in the packet stream system illustrated in FIG. 1. Although the present invention is described below using the MPEG transport stream as an example, those skilled in the art will realize that the present invention can be applied to any bitstreams, i.e., a MPEG "program stream" or any other packet streams in accordance with other formats.

System 100 includes a video encoder 120 for receiving and encoding video data on path 110 into an elementary video bitstream. Similarly, the system also includes an audio encoder 122 for receiving and encoding audio data on path 112 into an elementary audio bitstream. In turn, these bitstreams are sent to packetizers 130 and 132 where the elementary bitstreams are converted into packets. Information for using the packets independently of the transport stream may be added when the packets are formed in the packetizers. Thus, non-audio/video data, e.g., SI, are also packetized into transport stream, but the sources of these non-audio/video data are not shown in FIG. 1.

The packets are received and multiplexed by the transport stream multiplexor 140 to produce a transport stream on path 145. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream on path 145 is transmitted over a transmission channel 150, which may further incorporate separate channel specific encoder and decoder (not shown). Next, the transport stream is demultiplexed and decoded by a transport stream demultiplexor 160, where the elementary streams serve as inputs to video decoder 170 and audio decoder 190, whose outputs are decoded video signals on path 175 and audio signals on path 195 respectively.

Furthermore, timing information is also extracted by the transport stream demultiplexor 160 and delivered to clock control 180 for synchronizing the video and audio decoders with each other and with the channel. Synchronization of the decoders with the channel is accomplished through the use of the PCR in the transport stream, where the PCR is used to derive the decoder timing.

Figure 2:
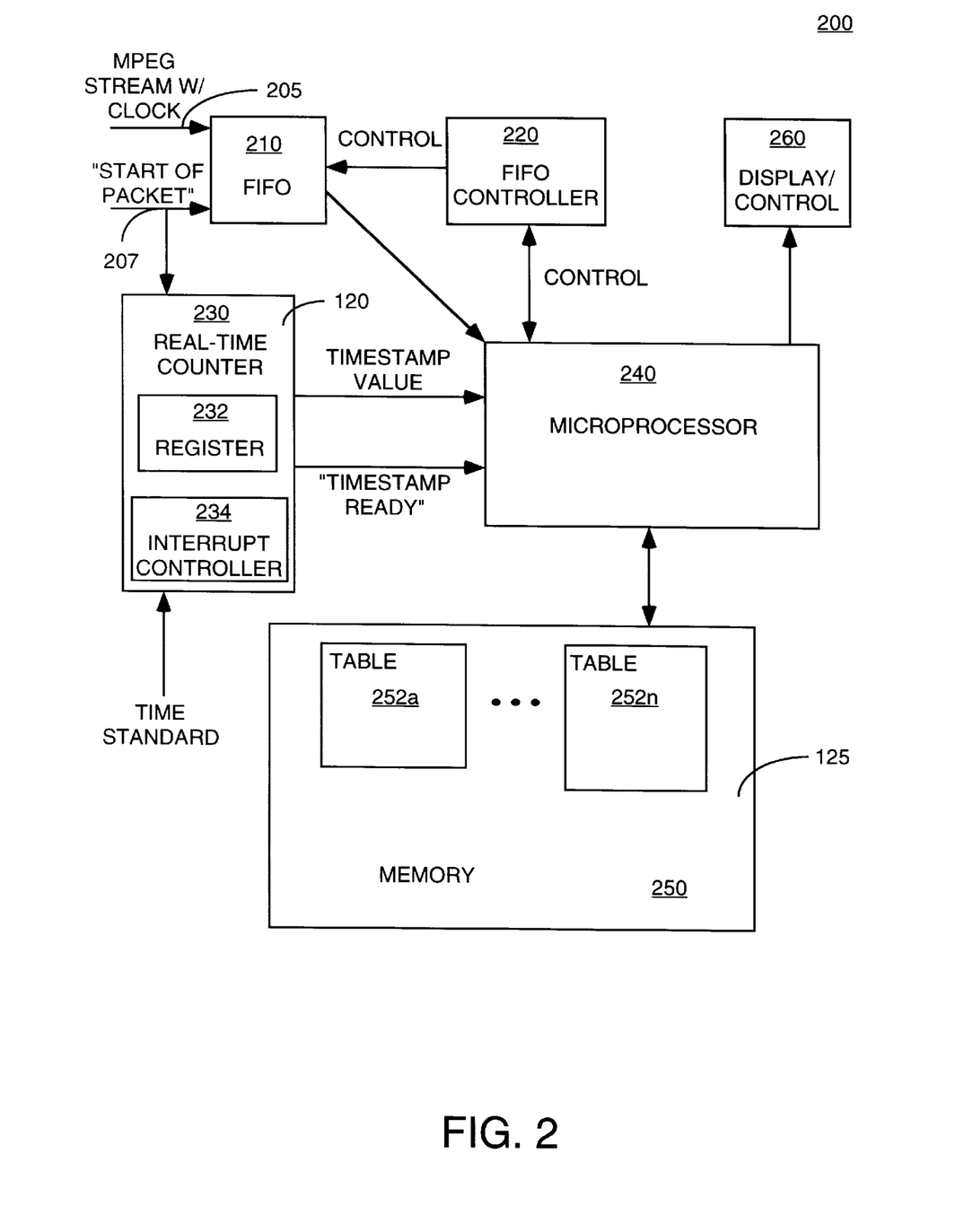
FIG. 2 illustrates a bitstream analyzer of the present invention for performing real time bitstream analysis.

FIG. 2 illustrates a block diagram of the bitstream analyzer 200 of the present invention for monitoring and performing real time bitstream analysis on a multiplexed bitstream, such as a MPEG-2 transport stream. The bitstream analyzer 200 can be implemented before the transport stream demultiplexer 160 as a separate device or it can be integrated with the function of transport stream demultiplexer 160 as illustrated in FIG. 1. Thus, the present bitstream analyzer can be implemented within a larger decoding system that is able to provide real time bitstream analysis on a multiplexed bitstream.

The bitstream analyzer 200 serves to verify and monitor various time elements in the bitstreams, e.g., the accuracy and correctness of the PCR data and the inter-arrival time of SI. The bitstream analyzer extracts the time-base for each elementary stream and verifies that constraints on the PCR's are not violated. Similarly, the bitstream analyzer processes packets which contain SI information in the transport stream. The processing verifies that successive "sections" from the same group of types (defined below) are not occurring inside of the specified time interval, e.g., within 25 msec of each other.

Returning to FIG. 2, the bitstream analyzer 200 comprises an input buffer 210, a buffer controller 220, a counter 230, a processor 240, a memory 250 and a display 260. More specifically, the bitstream analyzer receives as an input a real-time digital bitstream on path 205, such as an MPEG transport stream, carrying clock information in the form of PCR data and an indicator of the "start of packet", e.g., MPEG provides that the first byte of each packet shall be a value of "47" (hex). This predefined value allows the decoder to detect the start of a packet.

Alternatively, the start of packet indicator can be received as a separate external signal on path 207. Depending on the specific application, a decoding system may employ additional processing such that the start of packet indicator is previously detected and extracted from the bitstream and is subsequently presented to the bitstream analyzer 200 on path 207.

The packets of the bitstream are received into a fifo (first-in, first-out) memory 210 which has a suitable capacity to store at least several packets of data. In one embodiment, the fifo is 21 packets deep.

When the start of packet is detected, the counter 230 which is running in real time, records the time of reception of the start of packet (timestamp of the start of packet) into a register 232. Namely, the real time counter 230 counts cycles of a standard clock, e.g., a clock operating at a frequency of 27 MHz. When a start of packet is detected, the current value of the counter 230 is copied into the register 232. When the register 232 is loaded, interrupt controller 234 issues an interrupt to the processor 240 to indicate that another start of packet was detected. Although the register 232 and interrupt controller 234 are illustrated within counter 230, it should be understood that they can be implemented outside of the counter 230.

In the preferred embodiment, processor 240 is a microprocessor, e.g., a TMS320C31 or "C31" microprocessor from Texas Instruments. Responsive to the interrupt from the interrupt controller 234, the processor 240 reads the register 232 and stores the register value to a timestamp storage. Namely, the processor performs a direct memory access (DMA) transfer of the timestamp in the register, which is memory mapped into the processor address space as a value in a table in the memory 250. The memory 250 contains various tables 252A and 252n which consist of the timestamp tables (list of times of receipt of packets) and other tables which are described below. When a certain number of DMAs have occurred, e.g., twenty-one (21), the processor interrupts itself, and the address pointers are reset. The processor also reads the packets out of the fifo 210, parsing the packets as they are read. Using the packet data and the timestamps indicating their arrival, the processor is able to verify the accuracy and correctness of the PCR data and the inter-arrival time of SI.

The processor can work in real-time, that is, it can process each packet of data within a fixed delay relative to the time of reception. In real time applications, the number of packets in buffer 210 can vary from time to time depending on the time required for processor 240 to process preceding packets and to perform other tasks such as refreshing display 260.

The processor reads packet data from buffer 210 and the time of reception from timestamp table 252. The software applications or methods executed in processor 240 use the values in the timestamp table 252 to process a packet's data stored in buffer 210 and evaluate its time elements in the context of its time of reception. The preferred embodiment provides for real-time operation while allowing the microprocessor to perform other tasks as long as these tasks do not delay processing of any packet for more than 21 packet times.

The fifo (buffer) controller 220 controls the fifo 210 by resetting the fifo upon restart, measuring the fullness of the fifo to prevent underflow and controlling the clocking out of data to the processor 240. Namely, due to potential memory addressing discrepancies between the processor and the fifo, the fifo controller serves as an interface between the fifo and the processor, e.g., converting a read enable signal (control signal) from the processor to the proper clock out cycle of the fifo. However, it should be understood that the functions performed by the fifo controller 220 could be implemented within the processor 240.

Finally, a display 260 is coupled to the processor to display the results from the bitstream analyzer. The display allows a user to monitor and perform real time bitstream analysis on a multiplexed bitstream.

Figure 3:
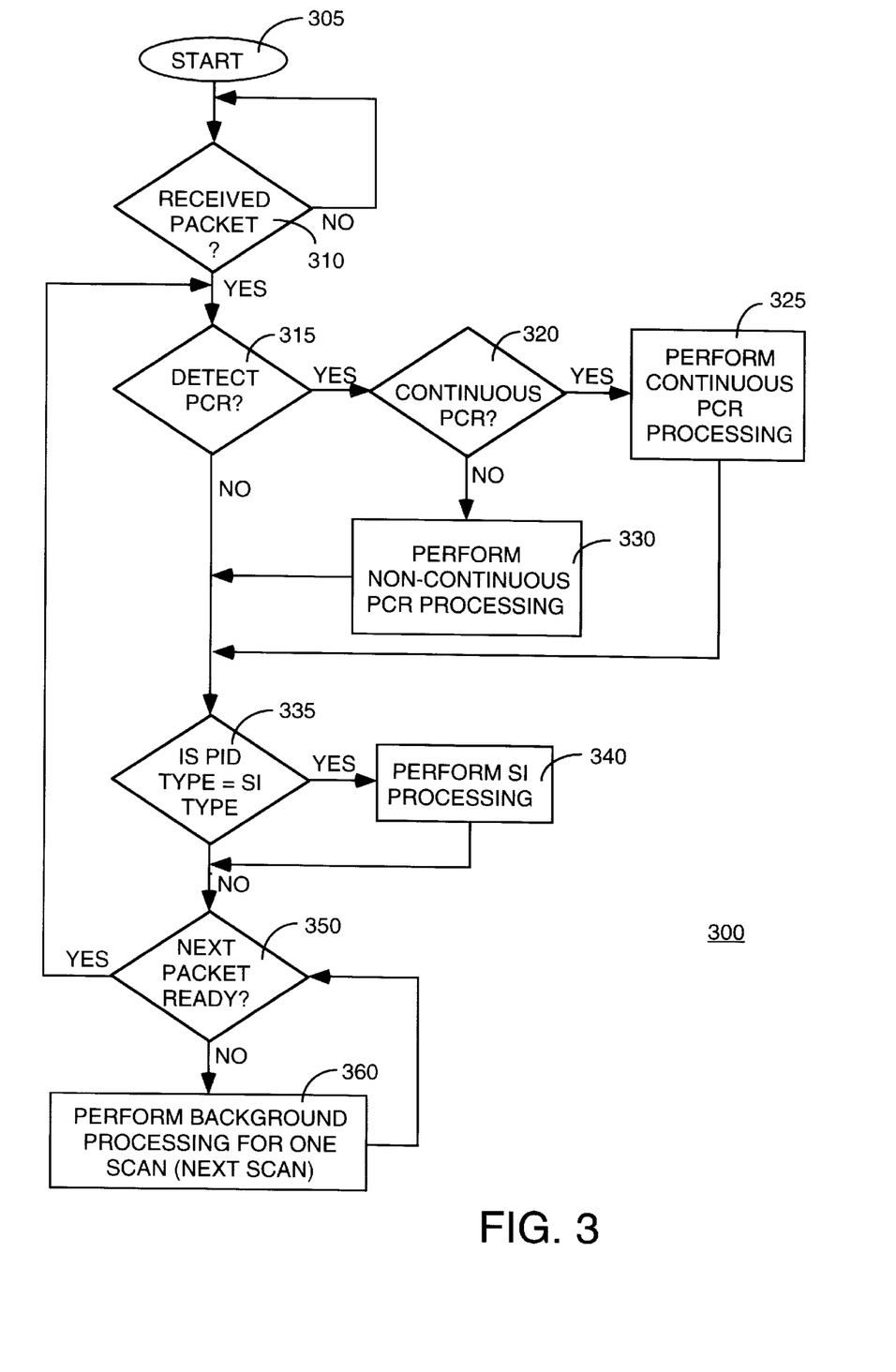
FIG. 3 illustrates a flowchart of a method for performing real time bitstream analysis.

FIG. 3 illustrates a flowchart of a method 300 for performing real time bitstream analysis. More specifically, method 300 verifies and monitors various time elements in the bitstreams, e.g., the accuracy and correctness of the PCR data and the inter-arrival time of SI. Generally, the PCR data (values) which represent the clock reference of the signal, appear regularly in the bitstream, e.g., a PCR value may appear in the bitstream approximately once every 0.1 second. In the preferred embodiment where the bitstream is an MPEG transport stream, the PCR values represent the ticks of a 27 Mhz. reference clock. The decoding system is expected to apply the PCR values to derive its "system time clock" (STC), which tracks the encoding system's time clock as represented by the PCR values. Thus, several important aspects that are monitored by the present method include the discontinuity state of the packet, the time jitter of the PCR data and the inter-arrival time of the PCR data (PCR Gap). Furthermore, the present method also monitors the inter-arrival time of SI. Each aspect is discussed in detail below.

Referring to FIG. 3, the method 300 begins at step 305 and proceeds to step 310, where method 300 queries whether packet data is received and available into the fifo 210. If the query is affirmatively answered, then method 300 notes the packet identifier (PID) of the current packet and proceeds to step 315. If the query is negatively answered in step 310, method 300 waits until a packet is received.

In step 315, the method 300 queries whether PCR data is detected in the current packet. If the query is affirmatively answered, then method 300 proceeds to step 320, where another query is made to determine whether the PCR in the received packet data is part of a continuous sequence of PCRs from the encoder, or if it represents the start of a new sequence as shown by a discontinuity_indicator bit in the stream. If the query is negatively answered, then method 300 proceeds to step 335, where another query is made to determine if the PID of the current packet correlates to a packet that carries SI.

In step 320, method 300 determines the discontinuity state for the current PCR. The PCR processing depends on the discontinuity state for the transport packet that contains the PCR field. Before the PCR processing is performed, the discontinuity state for each packet is determined by reading and interpreting the header of the packet and any adaptation field. The discontinuity state for the transport packet is reported in the adaptation field under the parameter "discontinuity_indicator". If the discontinuity state is true (discontinuity in PCR is allowed), method 300 proceeds to step 330 where the discontinuous PCR processing is performed. If the discontinuity state is not true (discontinuity in PCR is NOT allowed), method 300 proceeds to step 325 where normal, continuous PCR processing is performed.

In step 325, packet arrival times are used as basis for updating the PCR time-base for the current PID. This updating simulates the operation of a Phase Locked Loop (PLL). The difference of the PCR value and the PCR time-base for current PID (the time jitter) is used to verify that the PCR values are continuous and within specifications (PCR Jitter Test, as discussed below) and the calculated arrival time is used to test if the interval between PCR fields in the bitstream are within specifications (PCR Gap Test, as discussed below).

In step 330, the PCR processing is limited to the resetting of the various parameters in the simulated PLL operation and only the PCR GAP Test is performed. The PCR Jitter Test is not performed under the discontinuous PCR processing.

In step 335, method 300 queries whether the PID of the current packet correlates to a packet that carries SI. If the query is affirmatively answered, then method 300 proceeds to step 340 where SI processing is performed. In the preferred embodiment, the PID values that correlate to packets that carry SI are PIDs 16, 17, 18, 19 and 20 in accordance with the DVB standard. It should be understood that other PID values may carry SI in accordance with other standards, e.g., ATSC. Thus, the set of PID values associated with SI packets can be adjusted in accordance with a particular implementation.

If the query is negatively answered in step 335, then method 300 proceeds to step 350. In one embodiment, packets that do not carry PCR data or SI are simply read out of the fifo 210 and discarded.

In step 350, method 300 queries whether the next packet is received and ready for processing. If the query is affirmatively answered, then method 300 returns to step 315. If the query is negatively answered, then method 300 proceeds to optional step 360, where a background processing is performed for one "scan" (or next scan) to selectively purge one or more entries in the various tables stored in the memory 250. The background processing method can also be employed to verify PCR gaps on all successive PIDs during the PCR Gap analysis as discussed below.

For example, the PID values may range over eight thousand possible values. Such large variation of PID values requires a large capacity memory to store all the relevant parameters for each PID value. Since there may be a long delay or pause between reception of packets of the same PID value, it is more cost effective to employ a background processing to purge parameters associated with non-current PID values, thereby reducing the computational overhead of the processor and the size requirement of the memory 250.

When method 300 completes the background processing, it returns to step 350 to determine if the next packet is received. If the next packet has not been received, method 300 continues with the background processing for the next scan and so on, until the next packet is received.

Figure 4:
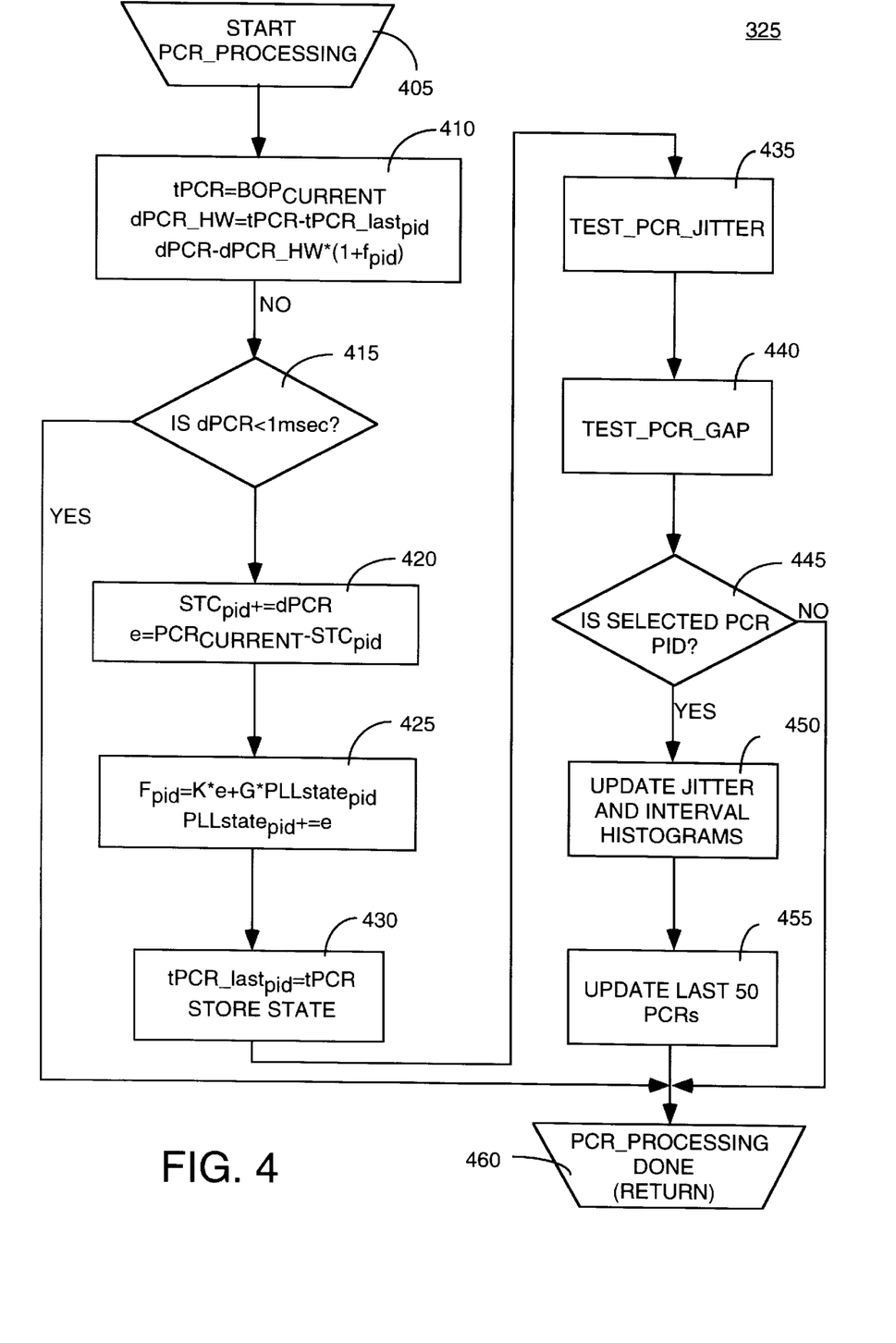
FIG. 4 illustrates a flowchart of the continuous PCR processing method.

FIG. 4 illustrates a flowchart of the continuous PCR processing method 325. Namely, method 325 correlates to step 325 of FIG. 3.

Referring to FIG. 4, the method 325 begins at step 405 and proceeds to step 410, where method 325 calculates the parameters associated with the PID. Namely, the parameters tPCR, dPCR_HW, and dPCR are calculated or set.

The parameter tPCR is defined as the timestamp value of the reception of the current PCR for the current packet or PID (since each packet is defined by a unique PID). Thus, tPCR can be expressed as:

$$tPCR = BOP_{CURRENT} \quad (1)$$

where $BOP_{CURRENT}$ correlates to the timestamp value for the arrival time (reception time) of the beginning of the current packet. However, equation (1) is only an estimation. The parameter tPCR can be more accurately expressed as:

$$tPCR = BOP_{CURRENT} + (BOP_{LAST} - BOP_{CURRENT}) * (6/Packet\_Length) \quad (2)$$

where $(BOP_{LAST} - BOP_{CURRENT})$ represents the amount of time necessary to receive a packet, i.e., the difference between timestamp values for the reception time of the beginning of the last packet and the beginning of the current packet. Additionally, Packet_Length represents the length of the packet, i.e., the number of bytes in the packet, e.g., 188 bytes for MPEG. Equation (2) is necessary due to the fact that MPEG defines the time of the PCR to be the time when the sixth byte of the packet is received. However, for most applications, the estimation provided by Equation (1) should be adequate. It should be understood that Equation (2) is tailored specifically for MPEG. As such Equation (2) can be adjusted or replaced completely to account for other bitstream standards.

The parameter dPCR_HW is defined as the difference between timestamp values of the reception of the current tPCR and the previous tPCR_last$_{pid}$ of the same PID value as stored in the memory. Thus, dPCR_HW can be expressed as:

$$dPCR\_HW = tPCR - tPCR\_last_{pid} \quad (3)$$

Namely, dPCR_HW represents the difference in time (local time of the decoder) between successive receptions of PCRs of the same PID value. However, dPCR_HW does not account for any discrepancies between the decoder clock and the encoder clock.

As such, the parameter dPCR is defined as the difference between timestamp values of the reception of the current tPCR and the previous tPCR_last$_{pid}$ of the same PID value adjusted by a factor of "$f_{pid}$", which is a measure of the difference in rate between the encoder clock and the decoder clock. The frequency, as controlled by "$f_{pid}$" is restricted to lie within the MPEG limits. Thus, "$f_{pid}$" is the difference in clock frequency between local time reference and encoders' time reference.

More specifically, the frequency offset value "$f_{pid}$" is unitless, expressed as the frequency represented in the incoming PCRs minus the internal reference frequency divided by the internal reference frequency. This is equivalent to the ratio of the encoder and decoder clocks, minus one. The factor "f" should be zero nominally. Thus, dPCR can be expressed as:

$$dPCR = dPCR\_HW * (1 + f_{pid}) \quad (4)$$

The term $f_{pid}$ is further defined below. Thus, DPCR is a "corrected" time difference between successive PCRs of the same PID value.

Returning to FIG. 4, in step 415 method 325 queries whether the calculated dPCR is less than a threshold value, e.g., 1 msec. in the preferred embodiment. If the query is negatively answered, method 325 proceeds to step 420. If the query is positively answered, method 325 proceeds to step 460, where PCR processing is not performed. Namely, in step 415, if the time interval between PCRs of the same PID is too close, method 325 simply avoids processing these PCRs to reduce the computational overhead of the processor. Depending on the computational overhead of the processor, the threshold can be adjusted for a particular implementation or tuned to the capability of the hardware.

In step 420, method 325 updates the STC$_{pid}$, i.e., the system time clock for a particular PID with the dPCR. The resulting updated STC$_{pid}$ represents the time for the current PID.

In turn, the error parameter "e" is calculated using the updated STC$_{pid}$, where the error e represents the difference between the STC$_{pid}$ and the actual current PCR$_{CURRENT}$ value, i.e., the actual numerical value of the current PCR as read from the bitstream. Thus, the error e can be expressed as:

$$e = PCR_{CURRENT} - STC_{pid} \quad (5)$$

It should be noted that the jitter of any PCR is often also defined as the value "e" measured when the PCR is received. The units of "e" are counts of the 27 MHz system clock. If e is equal to zero, then the decoder clock is synchronized with the encoder clock. However, if e is not equal to zero, then the decoder clock is not synchronized with the encoder clock and a frequency offset $f_{pid}$ calculated in step 425 to account for the discrepancy. Thus, $f_{pid}$ can be expressed as:

$$f_{pid} = (k * e) + (G * PLLstate_{pid}) \quad (6)$$

where k and G are constants and PLLstate$_{pid}$ represents an integrator.

Figure 5:
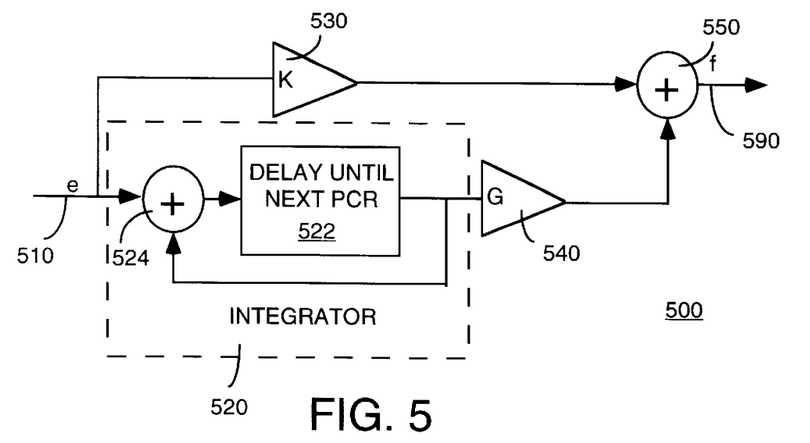
FIG. 5 illustrates a block diagram of a filter that converts error "e" into frequency offset "f"

More specifically, equation (6) can be represented by a filter 500 as illustrated in FIG. 5. The filter comprises a constant multiplier k 530, a constant multiplier G 540, a sumer 550 and an integrator 520 having a delay 522 and a sumer 524. The filter 500 which converts the values e(0) . . . e(n) on path 510 into f(0) . . . f(n) on path 590, is a variation on a PLL design. The filter 500 differs from a time-sampled filter, in that the length of time between PCRs is unknown. The values of k and G are chosen to make the filter stable for all intervals up to the maximum MPEG 2 PCR interval of 0.1 seconds. The use of a pure integrator around the delay assures that the loop will behave the same even if decoder and encoder systems have different clock frequencies for interval measurement.

It should be noted that "k" and "G" must have units of counts$^{-1}$, where in one embodiment, k is set to 1/(27,000,000*0.1). The constant G is set to 0.1/(27,000,000*0.1). This filter allows the "PLL Tracking" operation to settle to 1% in less than one second. Testing of PCR Accuracy may be 20 masked for a period after each discontinuity to allow the PLL to settle. These specific constant values for k and G can be used with both MPEG 2 and MPEG 2+DVB modes. However, it should be noted that other constant values can be employed to account for different applications.

Figure 6:
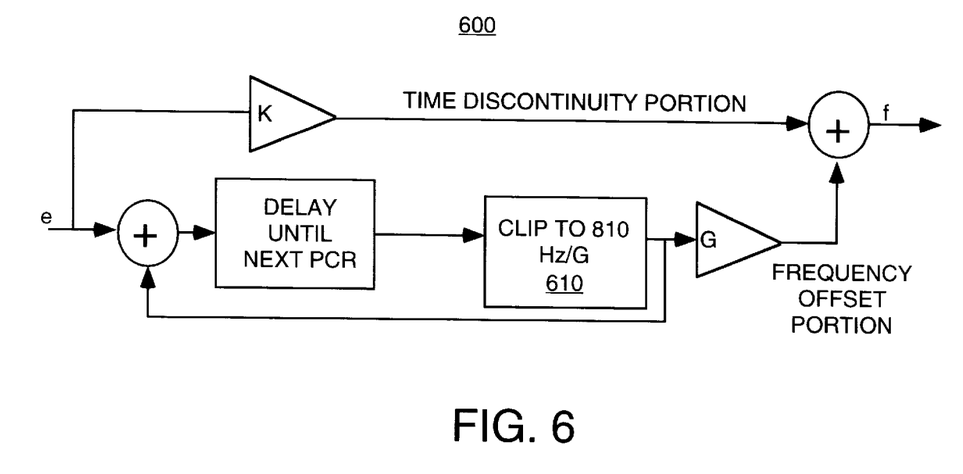
FIG. 6 illustrates a block diagram of another embodiment of a filter that converts error "e" into frequency offset "f"

FIG. 6 illustrates a block diagram of another embodiment of a filter 600 that converts error "e" into frequency offset "$f_{pid}$". This second embodiment of the "PLL Tracking" operation is essentially the same as the embodiment illustrated in FIG. 5 with the exception of a limiter or clipper 610. The limiter is added to the integration loop to keep the frequency offset to within 810 Hz (i.e., maintaining the difference in frequency between the encoder clock and the decoder clock within 30 ppm) in accordance with the MPEG specifications.

The feed-forward portion of "$f_{pid}$" (i.e., e * k) is the "time discontinuity portion", which is not clipped by the limiter in the preferred embodiment. This improves stability of the integration loop.

Furthermore, when using an external clock, it is generally assumed that the external clock's accuracy is absolute, thereby allowing the limiter 610 to be set to 30 ppm. However, when the internal clock is used (or if the accuracy of the external clock is not absolute), which only has a 30 ppm accuracy in one embodiment, the limiter 610 must be set to at least±60 ppm (the sum of the local oscillator's inaccuracy and the MPEG inaccuracy). However, it should be understood that the setting of the limiter can be adjusted in accordance with a particular application to account for clock inaccuracy and the constraints dictated by the relevant standards.

In the preferred embodiment, the clipping value of the delay feedback should be such that if e=0, $f_{pid}$ will be no more than 60 parts per million off. Thus, the clipping threshold C can be expressed as:

$$C=(tolerance/gain\_to\_f)=(60/1000000)/G, \quad (7)$$

Thus, if G=0.1/2700000, then C=600*2700000/1000000 or 60*27/1 or 1620.0 However, if the external clock is employed, then the value is 810.0.

Returning to FIG. 4, once $f_{pid}$ is calculated for the current PID, method 325 proceeds to step 430, where the current states of the various parameters associated with the current PID are updated in the memory. For example, the time of reception of the current PCR (i.e., tPCR) is now stored as the time of reception of the last PCR (i.e., tPCR_last$_{pid}$). Other stored states include $f_{pid}$ and PLLstate$_{pid}$.

Steps 410, 420, 425 and 430 can be collectively referred to as a simulated PLL operation (or frequency tracking operation) being performed for each PID. Namely, a frequency correction is calculated and tracked for each PID.

In step 435, method 325 performs the PCR_Jitter processing or testing method. The PCR_Jitter processing verifies that the PCR values for the current PID are continuous and within the constraints defined by the relevant standards. The PCR_Jitter processing is described below in FIG. 7.

In step 440, method 325 performs the PCR_Gap processing or testing method. The PCR_Gap processing verifies that the time interval (arrival time) between successive PCR values of the same PID is within the constraints defined by the relevant standards. The PCR_Gap processing is described below in FIG. 8.

Method 325 then proceeds to optional steps 445 to 455, which are employed to perform statistical analysis. Namely, in step 445, method 325 queries whether a particular PID is selected for updates of its jitter and PCR interval (e.g., dPCR) histograms in step 450. The jitter histogram contains various "bins" where each bin represents certain value of PCR jitter, which is derived from the value of "e". Similarly, the PCR interval histogram contains various "bins" where each bin represents certain value of PCR interval. If the query is affirmatively answered in step 445, then method 325 proceeds to step 450 where the histograms are updated in accordance with "x" number of last PCRs specified in step 455, e.g., the last 50 PCRs. The histograms can be recalled by a user to view the jitter and PCR interval patterns for a particular PID. Method 325 then ends in step 460.

Figure 7:
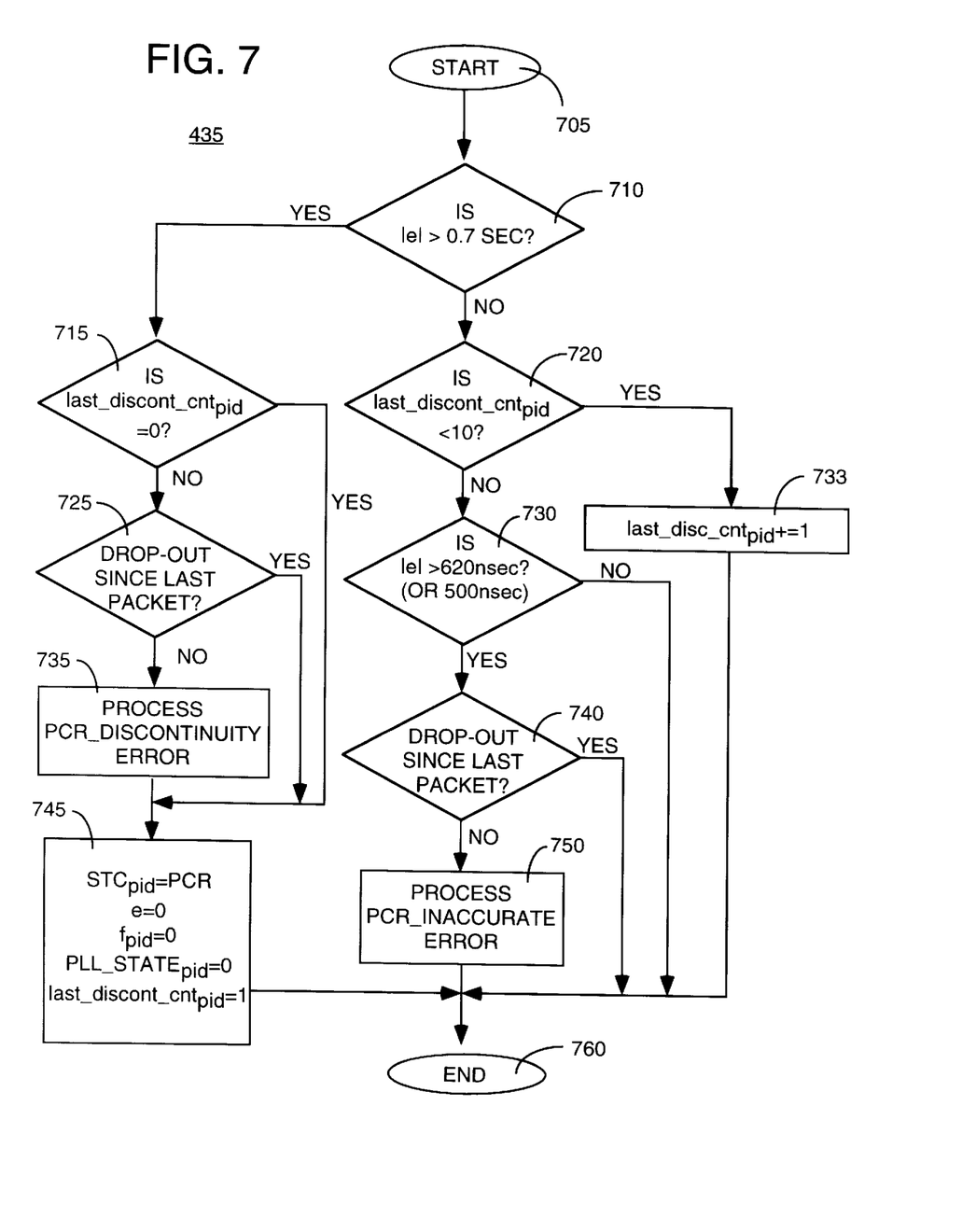
FIG. 7 illustrates a flowchart of the PCR_Jitter processing method.

FIG. 7 illustrates a flowchart of the PCR_Jitter processing method 435. Namely, method 435 correlates to step 435 of FIG. 4.

Referring to FIG. 7, the method 435 begins at step 705 and proceeds to step 710, where method 435 queries whether the absolute value e is greater than 0.7 sec. If the query is affirmatively answered, then method 435 proceeds to steps 715–745, where method 435 determines whether an undetected discontinuity has occurred. If the query is negatively answered, then method 435 proceeds to step 720, where method 435 determines whether the necessary number of stored PCR values of the current PID has been received to warrant the start of the PCR jitter processing.

In step 715, method 435 queries whether the "last discontinuity count" parameter ("last_discont_cnt$_{pid}$") is set to zero (0). If the "last_discont_cnt$_{pid}$" is set to zero, then the current PCR value that was used to calculate "e" is the first PCR value for the present PID. Namely, if the query is affirmatively answered, method 435 determines that there is no discontinuity because a single PCR value cannot properly generate the error factor "e". As such, the method 435 proceeds to step 745, where the various parameters or variables are reset. Namely, STC$_{pid}$ is set to the current PCR value; the error factor "e" is set to zero; $f_{pid}$ set to zero; PLLstate$_{pid}$ is set to zero and "last_discont_cnt$_{pid}$" is incremented to one (indicating at least one PCR value has been received for the current PID without a discontinuity).

If the query is negatively answered, then method 435 proceeds to step 725 where method 435 queries whether a "drop-out" was detected since the last packet corresponding to the current PID was received. Namely, the method 435 determines if the current PCR value was received after a drop-out event or a period of time where the transmitted bitstream was interfered with, e.g., a particularly noisy transmission channel. In other words, the current PCR is separated from the last PCR by a reported drop-out. Since a bitstream is typically coded with correction schemes, e.g., block or convolution coding, the decoding system will employ the complementary decoders to error correct the data in the bitstream. If error correction schemes are unable to correct the bitstream, the decoding system will often declare that a drop-out (discontinuity) has occurred for the affected packets and post drop-out flags against particular PIDs. Thus, if the query at step 725 is affirmatively answered, then method 435 proceeds to step 745 where the parameters are once again reset. The method 435 does not report an unexpected discontinuity, since a drop-out has already been previously reported.

However, if the query at step 725 is negatively answered, then method 435 proceeds to step 735 where an unexpected discontinuity is reported by the bitstream analyzer, e.g., via display 260. Since method 435 is unable to attribute the high "e" value to one of the previously discussed events, then an unexpected discontinuity must have occurred. After reporting the discontinuity, method 435 proceeds to step 745 where the parameters are once again reset.

In step 720, method 435 queries where parameter "last_discont_cnt$_{pid}$" is less a predefined threshold, e.g., 10 continuous PCR values of the same PID. The purpose of setting such a threshold is to ensure that prior to performing the jitter analysis, sufficient PCR values must have been received to ensure that the PLL tracking operation is producing reliable calculations. Namely, a wait period of 10 PCR times is allow to transpire before the states of the PLL frequency tracking can be deemed to be accurate. It should be understood that the present invention is not limited to a threshold of 10 PCR values and that this threshold can be modified to accommodate a particular implementation.

Thus, if the query in step 720 is affirmatively answered, then method 435 proceeds to step 733, where the parameter "last_discont_cnt$_{pid}$" is incremented by one and the method proceeds to step 760. If the query in step 720 is negatively answered then method 435 proceeds to step 730.

In step 730, method 435 queries whether the error factor "e" is greater than a threshold, e.g., 620 nsec. It should be understood that MPEG defines the PCR tolerance to be no greater than 500 nsec. However, in one embodiment of the present invention, an inaccuracy in the measurement of 120 nsec. is added to the MPEG defined tolerance to allow for inaccuracy within the present bitstream analyzer. It should be understood that this added inaccuracy of 120 nsec. can be modified in accordance with a particular implementation. If the query in step 730 is answered negatively, then method 435 proceeds to step 760 without reporting a PCR inaccurate error. If the query in step 730 is answered positively, then method 435 proceeds to step 740 and queries whether a "drop-out" was detected since the last packet corresponding to the current PID. This query serves the same purpose as discussed in step 725. If the query in step 740 is affirmatively answered, then method 435 proceeds to step 760. The method 435 does not report a PCR inaccurate error, since a drop-out has already been previously reported, which most likely contributed to the PCR jitter.

However, if the query at step 740 is negatively answered, then method 435 proceeds to step 750, where a PCR inaccurate error is reported by the bitstream analyzer, e.g., via display 260. Since method 435 is unable to attribute the high "e" value to one of the previously discussed events, then a PCR inaccurate error must have occurred. After reporting the PCR inaccurate error, method 435 proceeds to step 760.

Figure 8:
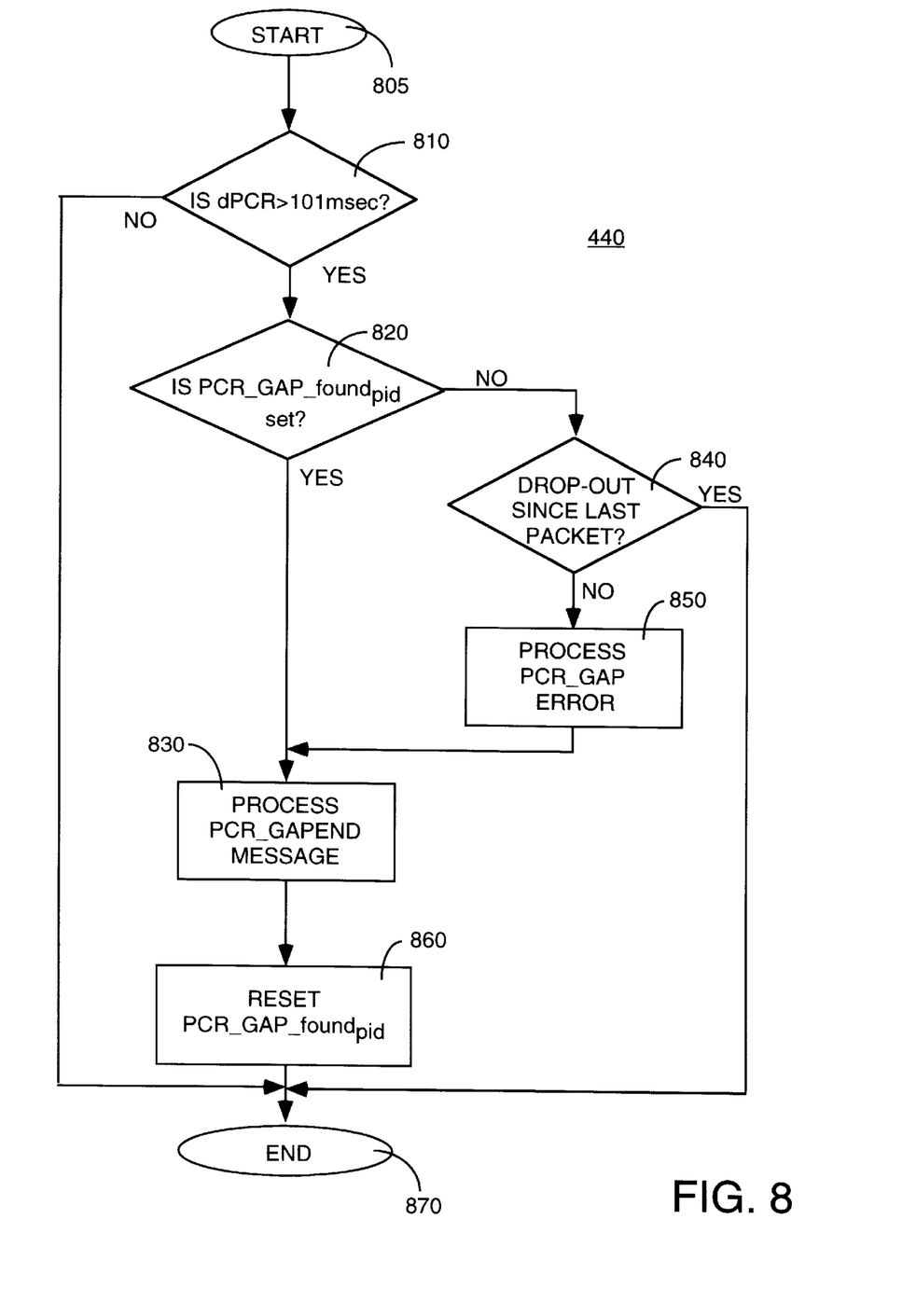
FIG. 8 illustrates a flowchart of the PCR_Gap processing method.

FIG. 8 illustrates a flowchart of the PCR_Gap processing method 440. Namely, method 440 correlates to step 440 of FIG. 4.

Referring to FIG. 8, the method 440 begins at step 805 and proceeds to step 810, where method 440 queries whether the dPCR (PCR Gap) is less than a predefined threshold. Namely, the MPEG standards define a constraint where PCR values have to occur once every 100 msec. However, this constraint can be modified for bitstreams that are compliant to other standards. In the preferred embodiment, an additional 1 msec. was added to the MPEG constraint to account for inaccuracy in numerical accuracy, e.g., rounding off. If the query is negatively answered, then method 400 proceeds to step 870 without reporting a PCR_Gap error. If the query is positively answered, then method 400 proceeds to step 820.

In step 820, method 400 queries whether the parameter PCR_Gap_found$_{pid}$ is set. The parameter PCR_Gap_found$_{pid}$ is generally set by a "background PCR Gap processing" method. Namely, method 440 is generally triggered by the reception of a PCR for a particular PID. Thus, if the next PCR for a particular PID is not sent by the encoder for a long period of time, the bitstream analyzer will not check for PCR Gap errors for that particular PID. As such, although a PCR Gap has occurred for a particular PID, the bitstream analyzer would be unable to detect the error until the next belayed PCR is received, which may not occur for many hours. Thus, the background PCR Gap processing method is employed to verify all PIDs to determine whether a last PCR exists for each PID. If a last PCR exists for a PID, then the background PCR Gap processing method compares that last PCR with the current time. If the difference is greater than 101 msec., then the PCR_Gap_found$_{pid}$ is set for that PID to indicate that a PCR Gap has occurred even when the next PCR has yet to be received.

Thus, if the query in step 820 is affirmatively answered, method 400 proceeds to step 830 without reporting a PCR Gap error, since that error has already been reported. However, if the query in step 820 is negatively answered, method 400 proceeds to step 840 and queries whether a "drop-out" was detected since the last packet corresponding to the current PID. This query serves the same purpose as discussed in step 725 of FIG. 7. If the query in step 840 is affirmatively answered, then method 440 proceeds to step 870. The method 440 does not report a PCR Gap error, since a drop-out has already been previously reported, i.e. a discontinuous stream is detected, which most likely contributed to the PCR Gap error. However, if the query at step 840 is negatively answered, then method 440 proceeds to step 850, where a PCR Gap error is reported by the bitstream analyzer, e.g., via display 260.

In step 830, method 400 reports the PCR_GAPEND. The actual PCR Gap is reported in step 830, e.g., a PCR Gap of "x" duration was detected for PID "x" and so on. Namely, the method 400 also reports that the PCR Gap has just ended, since the next PCR that triggered the method 400 has now been received. Thus, method 400 in step 860 resets the PCR_Gap_found$_{pid}$ to indicate that the PCR GAP error has been resolved at least for the moment. Method 400 then ends in step 870.

Figure 9:
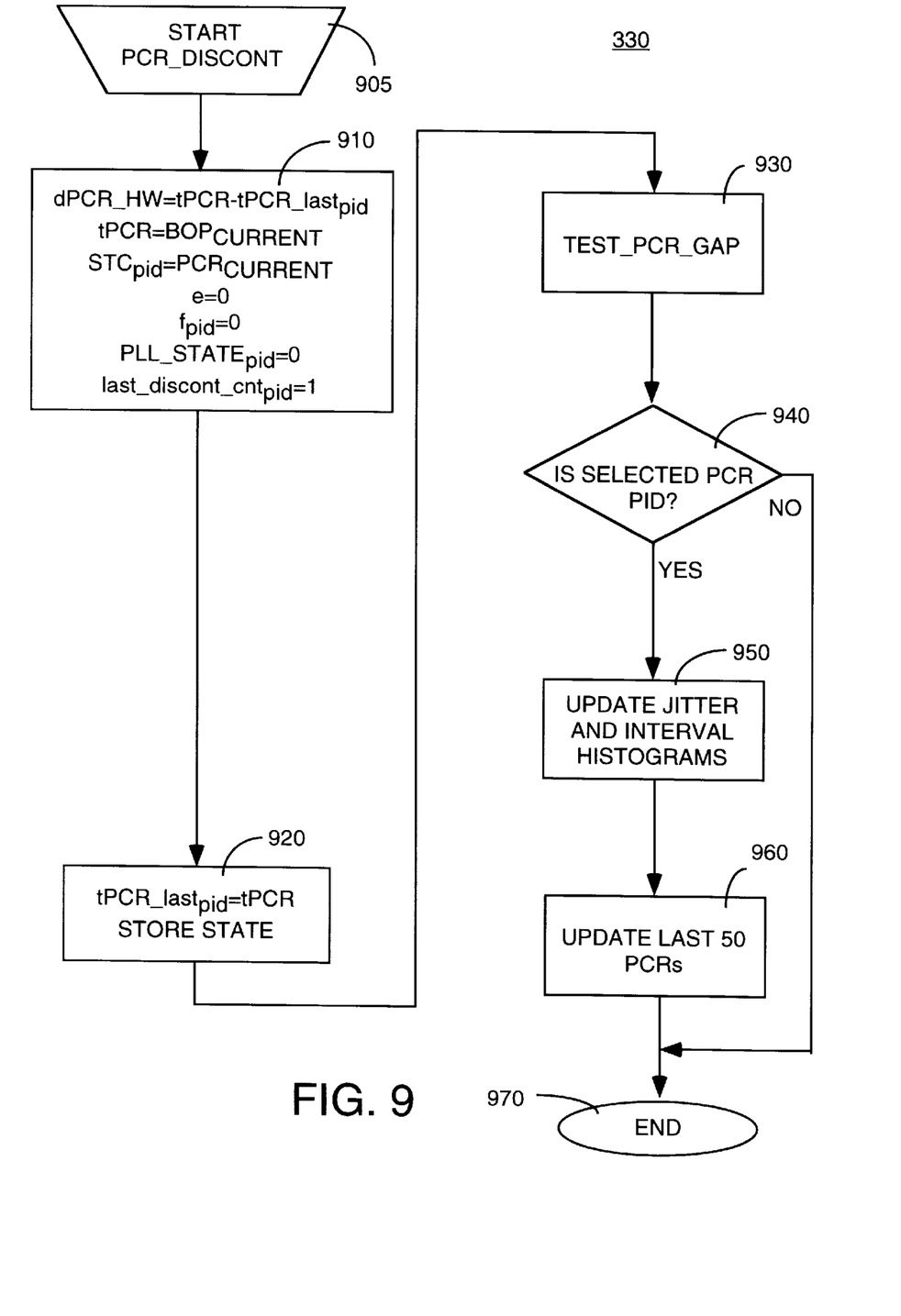
FIG. 9 illustrates a flowchart of the non-continuous PCR processing method.

FIG. 9 illustrates a flowchart of the non-continuous (discontinuous) PCR processing method 330. Namely, method 330 correlates to step 330 of FIG. 3. Although discontinuity is detected, it is still informative to monitor for PCR Gap error.

Referring to FIG. 9, the method 330 begins at step 905 and proceeds to step 910, where method 330 resets the various parameters. Namely, dPCR_HW is set equal to tPCR- tPCR_last$_{pid}$; tPCR is set equal to BOP$_{CURRENT}$; STC$_{pid}$ is set to the current PCR value; the error factor "e" is set to zero; f$_{pid}$ is set to zero; PLLstate$_{pid}$ is set to zero and "last_discont_cnt$_{pid}$" is incremented to one (indicating at least one PCR value has been received for the current PID without a discontinuity).

In step 920, method 330 updates the current states of the various parameters associated with the current PID in the memory. For example, the time of reception of the current PCR (i.e., tPCR) is now stored as the time of reception of the last PCR (i.e., tPCR_last$_{pid}$).

In step 930, method 330 performs the PCR Gap processing or testing method of FIG. 8 above. The PCR Gap processing verifies that the time interval (arrival time) between successive PCR values of the same PID is within the constraints defined by the relevant standards.

Finally, method 330 proceeds to optional steps 940–960 which are identical to steps 445–455 as discussed above. Again, these steps provide histograms that can be viewed by a user.

The present invention as shown in FIG. 3, includes a Service Information, "SI", processing method. Namely, the DVB (Digital Video Broadcasting) broadcast signal consists of several multiplexed information streams, including video, audio and data. It also contains several streams which are used to define and control decoding of these information streams. These control streams are broken into two groups: Program Specific Information, "PSI" is defined in the MPEG standard, and gives basic definitions of the information streams. Service Information, "SI" is defined in the DVB standard, and provides user-friendly information about the information streams. SI information includes information about the network configuration, the services on the network, event descriptions and the running status of events (e.g. "60 Minutes will start at 7:35 PM"). Other, more obscure structures include "bouquets" of channels, and time-zone offsets can also be sent.

The multiplexed information streams may contain several hundred programs, each with its own entry in the PSI and SI information tables. To prevent overload in a set-top box, system designers can specify a method of selecting a relevant subset of the information on the control stream. A "filter" is presented to the data stream and only some portion of the stream passes through to be processed by the microprocessor in the set top box. The filtering method allows a decoder box to select any part (or "section") of the stream for interpretation. In this manner the decoder box's microprocessor does not have to process control information on channels which are not of current interest.

However, it is important that any set-top box be able to process control information on any program at any time. For this reason, the standards provide for constraints on the transmission rates of PSI and SI. These constraints prevent the filtering circuitry and the microprocessor from becoming overloaded with information. The MPEG Committee decided that PSI overload would be prevented through a set of buffer constraints. The DVB organization adopted a different approach to address overload prevention on the SI, by restricting the repetition rate, or, more accurately, the inter-arrival time for related sections of SI information.

More specifically, Section 5.1.4 of in the DVB specification prETS 300–468 May 1996 states (in part) that "For SI specified within this ETS the minimum time interval between the arrival of the last byte of a section to the first byte of the next transmitted section with the same PID, table_id and table_id_extension and with the same or different section_number shall be 25 milliseconds."

Figure 10:
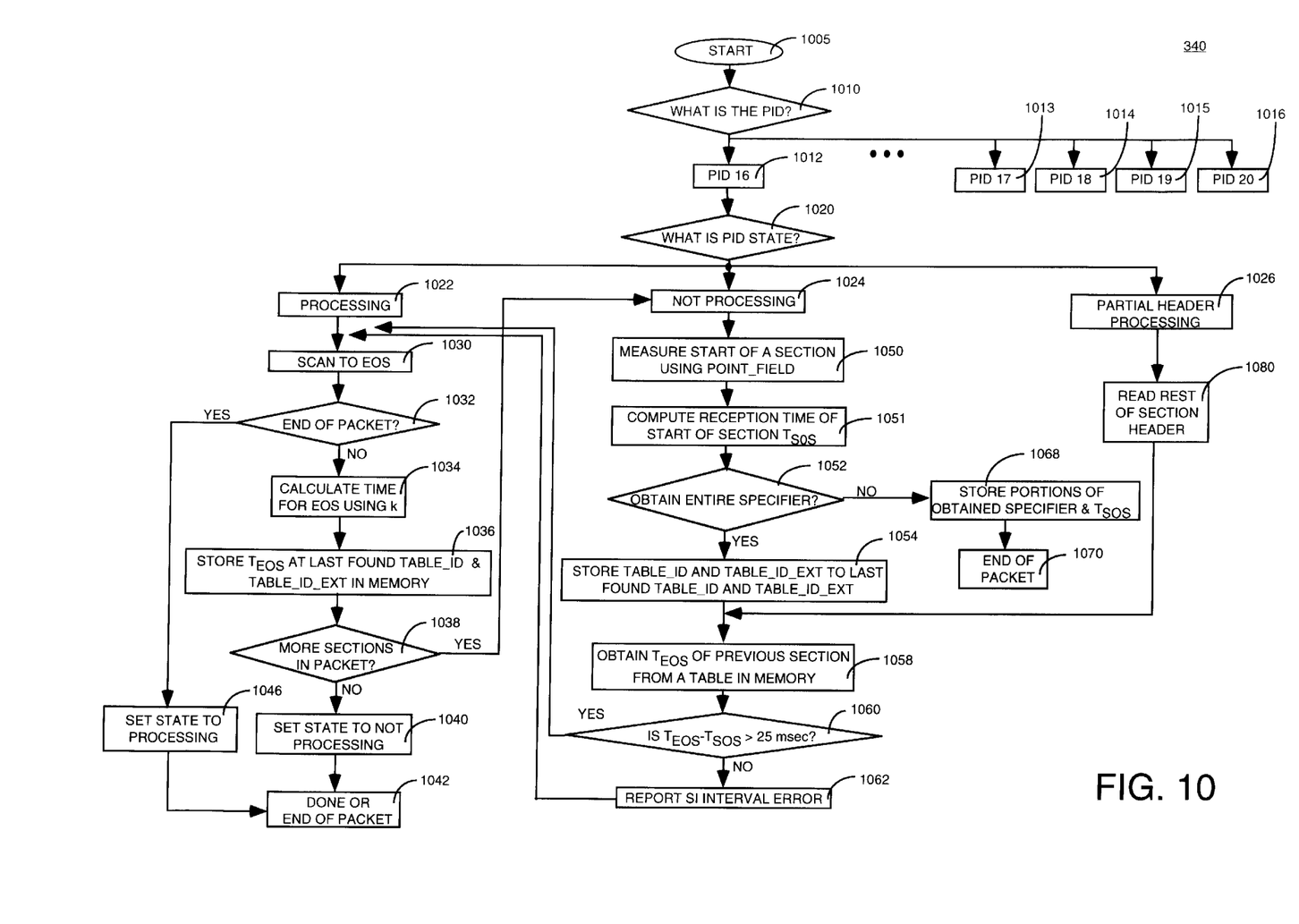
FIG. 10 illustrates a flowchart of a method for measuring conformance of the inter-arrival time for related sections of SI in a real-time system.

FIG. 10 illustrates a flowchart of a method 340 for measuring conformance of the inter-arrival time for related sections of SI in a real-time system, for example, the bitstream analyzer as shown in FIG. 2 above. Namely, method 340 correlates to step 340 of FIG. 3.

It should be noted that the SI specified in the ETS or MPEG PSI tables are segmented into one or more "sections" before being inserted into the transport stream packets. A "section" is a syntactic structure that shall be used for mapping all MPEG-2 tables and SI tables specified in this ETS, into transport stream packets. The SI tables that are verified by the present method include Network Information Table (NIT, identified by PID 16), Service Description Table/Bouquet Association Table (SDT/BAT, identified by PID 17), Event Information Table (EIT, identified by PID 18), Running Status Table (RST, identified by PID 19), and Time Date Table/Time Offset Table (TDT/TOT, identified by PID 20). It should be noted that the sections have variable lengths such that it is possible to receive many sections within a single packet or, conversely, a section may span over many packets.

To further complicate the matter, each SI table may carry many different types of sections, e.g., the EIT can carry up to 1.18 million types of sections. To identify each section, combination of "specifiers" are used to uniquely identify each type of section, e.g., "table_id" and "table_id_extension" are two examples.

Referring to FIG. 10, method 340 starts in step 1005 and proceeds to step 1010, where method 340 queries as to what is the current PID value. It is assumed that at this point the current packet has already been read, i.e., the packet was received in step 310 of FIG. 3. In this step, five possible PID values 16–20 can be determined where they correlate to the five SI tables. Thus, in step 1010, method 340 can proceed to one of five possible paths illustrated as 1012–1016. FIG. 10 only illustrates one complete path 1012, but it should be understood that all the paths are identical except that different types of sections are proceeded in each path.

In step 1020, method 340 queries as to what is the current state for the current PID. Three states are possible and they are "processing" 1022, "not processing" 1024 and "partial header processing" 1026.

In brief, the state of "processing" 1022 indicates that a section for the current PID is currently being processed. Namely, the "end of section" (EOS) was not detected before the end of packet indicator was encountered for the previous packet for this PID. As such, method 340 will continue the SI processing until the relevant EOS is scanned.

The state of "not processing" 1024 indicates that no section for the current PID is currently being processed. Namely, the "end of section" (EOS) was detected before the end of packet indicator was encountered for the previous packet for this PID.

The state of "partial header processing" 1026 indicates that not only a section is in process, but the specifiers for the section were not entirely obtained before the end of packet indicator was encountered for the previous packet for this PID. As such, method 340 will start SI processing by scanning for the remaining section header.

In step 1050, method 340 measures the start of a section. When a section is the first one in a packet, it can be found by using the parameter "pointer_field". This parameter reveals the location of the first byte of the first section that is present in the packet.

In step 1051, method 340 computes the reception time of start of section $T_{SOS}$. More specifically, the present bitstream analyzer of FIG. 2, provides the time of arrival of the start of a transport packet $T_{BOP}(n)$ and the time of arrival of the next packet $T_{BOP}(n+1)$. This allows estimation of the time of arrival of any byte in the packet by knowing the "Time of start of section" $T_{SOS}$ and Time of end of section $T_{EOS}$ and the number of byte times between them. In 204 byte/packet interval mode, byte k arrives at:

$$T_k = T_{BOP}(n) + (k/204)*(T_{BOP}(n+1) - T_{BOP}(n)) \qquad (8)$$

The system can operate in two different modes, 188 byte/packet mode or 204 byte per packet mode. In either mode, k can also be derived by the formula;

$$k = 188 - (bytes\ left\ in\ packet). \qquad (9)$$

SI information is divided into sections, which are not aligned with packets. Sections of SI are processed as follows (assume all sections have section_syntax_indicator==1).

In step 1052, method 340 queries whether the entire section specifier can be extracted from the current packet. If the query is affirmatively answered, then method 340 proceeds to step 1054, where the section specifiers, e.g., "table_id" and "table_id_ext" are stored at "last table_id found" and "last table_id_ext found" respectively in the memory.

If the query is negatively answered, then method 340 proceeds to step 1068, where the relevant section specifiers or portions thereof, e.g., "table_id" and "table_id_ext" (including $T_{sos}$) are stored at "last table_id found" and "last table_id_ext found" respectively in the memory. The main reason that method 340 is unable to read the entire set of section specifiers is that the section header was split between two packets. Namely, only a portion of the set of section specifiers was read before method 340 encountered the end of packet indicator in step 1070.

In step 1058, method 340 obtains $T_{EOS}$ of the previous section from a table stored within the memory 250.

In step 1060, method 340 queries whether $T_{EOS}-T_{SOS}$ his greater than 25 msec. If the query is affirmatively answered, then method 340 proceeds to step 1030.

If the query is negatively answered, then method 340 proceeds to step 1062, where an SI interval error is reported by the bitstream analyzer. method 340 proceeds to step 1030 to scan to the end of the current section or the end of the packet.

In step 1032, method 340 queries whether an end of packet indicator was encountered. If the query is affirmatively answered, then method 340 proceeds to step 1046, where the state of the current PID is set to "processing" and method 340 ends in step 1042 or encounters the end of packet indicator.

If the query is negatively answered, then method 340 proceeds to step 1034, where method 340 calculates $T_{EOS}$ by using k and stores the $T_{EOS}$ into a table based on the values of the "last_table_id and last_table_id_ext" in step 1036.

in step 1038, method 340 queries whether there are any more sections in the current packet. If the query is negatively answered, then method 340 proceeds to step 1040 which sets the state to "not processing" and discards all stuffing bits and then proceeds to step 1042, where method 340 ends or encounters the end of packet indicator. If the query is affirmatively answered, then method 340 proceeds to step 1050 where the process is again repeated until the end of packet indicator is encountered.

Returning to step 1026, if method 340 determines the PID state to be "partial header processing" then method 340 proceeds to step 1080 where the rest of the section head is read. Subsequently, method 340 proceeds to step 1056 where $T_{sos}$ is computed and method 340 proceeds as discussed above.

Since FIG. 10 is presented as a generic flowchart adaptable to all five SI tables, the following discussion below points out specific SI section requirements pertaining to each SI table. It should be noted that the NIT table (PID 16) allows only three types of sections:

network_information_section-actual network, (table_id=0x40)

network_information_section-other network (table_id=0x41) and stuffing_section. (table_id=0x72).

The stuffing_sections don't have to be checked for SI (this is true for all SI PIDs). The value of table_id_extension, called "network_id" can take any value from 0 to 0xFFFF. Although it seems that there could be 128 k possible combinations of table_id and table_id_extension, a network_id cannot be on both the actual and other network. Thus, only 64 k $T_{EOS}$'s and one $T_{SOS}$ must be tracked.

It should be noted that table SDT/BAT (PID 17) allows the following types of sections:

service_description_section-actual_transport_stream (table_id=0x42)

service_description_section-other_transport_stream (table_id=0x46)

bouquet_association_section(table_id=0x4A)

stuffing_section (which we are ignoring) (table_id=0x72).

Thus two tables, the SDT and the BAT share this PID. Each of these tables has 64 k possible entries. As in the NIT, the two types of SDT cannot overlap. For the SDT, the table_id_extension is the transport_stream_id. For the BAT, the table_id_extension is the bouquet_id. To keep track of these two tables, allocate 128 k of memory to save the $T_{EOS}$ values.

It should be noted that table EIT (PID 18) allows the following types of sections:

event_information_section-actual_transport_stream, present/following (table_id=0x4E)

event_information_section-other_transport_stream, present/following (table_id=0x4F)

event_information_section-actual_transport_stream, schedule (table_id=0x50–0x5F)

event_information_section-otherl_transport_stream, schedule (table_id=0x60–0x6F)

stuffing_section (which we are ignoring) (table_id=0x72).

In EIT sections, the table_id can take on up to 18 different values. The table_id_extension can take on up to 64 k values, called service_ids. The service_id is the same as the program_number in the Program Map Table (PMT) of a given transport_stream. The program_number must be unique for each transport_stream, but the number could be re-used across several streams.

If maintaining a direct table, such as the NIT or SDT, 18*64 k, or 1.18 megawords of memory are needed. In one embodiment, a background processing 360 (addressing) method as discussed in FIG. 3 was employed to use only 640 k words to address the entire total 1.18 megawords that are available.

The background processing method has the following features. First, only the most recent 1024 service_ids are monitored. Namely, if no information is sent for a particular service_id within a prescribed time, e.g., 10 seconds, then the background processing method removes service_id from the list of monitored service_ids.

Second, each service_id can include sections with any valid table_id. Each table_id's $T_{EOP}$ will be monitored independent of the other table_ids.

Third, the background processing method requires only 32 k+35*1 k memory locations for the tables, by maintaining two structures and several variables.

More specifically, the 32 k memory locations are a packed array of 64 k index values (i.e., 64 k possible values for service_ids), indices are values between 0 and 1023, packed two to a 32 bit word (DWORD). This array provides the link between service_id and structure number. It is called StrucNum[service_id]. Unused values in the array are set to NOT_IN_LIST.

A 1024 element array of structures, which holds the $T_{EOS}$ values for each table_id for a given service_id. This second array is called Struc[index]. Parts of this structure are referred to as Struc[i].part "part" is the structure entry, as in "C programming language."

Unused structures in this array form a linked list, and a "first free structure" variable points to the head of the list, called "first_free", which serves as an index. Namely, a link list is created in the StrucNum[service_id] array to point to he next free structure.

In the background, search through the array of structures, clearing out sections which no longer have activity. The variable which determines where to point in this search is next_scan_value. It is also an index.

One temporary variable is stored, used to speed up some of the processing. This is the "TempPointer" which is a hardware address. It should be noted that "TIME" is a format for time of arrival of a byte. It is represented as ticks of a 27 MHz clock. "SERVICE_ID" is a 16 bit number which is stored in the bottom 16 bits of a 32 bit DWORD. "INDEX" is a number which indicates an element in the array of structures.

The background processing method may be performed whenever the system has no other task to do as discussed in FIG, 3 above. For example, whenever the input FIFO does not contain a transport packet to process. This background processing method has no "while loops", so it will function in a real-time system. It also provides significant memory use advantage compared with the direct approach.

It should be noted that table RST (PID 19) allows only two types of sections:
  running_status_section (RST) (table_id=0×71)
  stuffing_section (which we are ignoring) (table_id=0× 72)
The running_status_section does not have a table_id_ extension, so only one value of $T_{EOS}$ has to be maintained for all RST sections. If it isn't a stuffing_section, check it against the previous section received.

It should be noted that table TDT (PID 20) allows the following types of sections:
  time_date_section (TDT) (table_id=0×70)
  stuffing_section (which we are ignoring) (table_id=0× 72)
  time_offset_section (TOT) (table_id=0×73)
Neither the TOT, nor the TDT contain more than one section. Two values of $T_{EOS}$ must be maintained, one for TDT, and one for TOT.

The total memory requirements for the SI test system is summarized in the table below.

| Table type(s) | memory used | addressing |
|---|---|---|
| NIT | 64 k | direct |
| SDT | 64 k | direct |
| BAT | 64 k | direct |
| EIT | 32 k + 1 k*35 | indirect w/ background garbage collection |
| RST | 1 | none |
| TDT | 1 | none / 2 way. |
| TOT | 1 | |

Although various embodiments which incorporate the teachings of the present invention have been shown and described in detail herein, those skilled in the art can readily devise many other varied embodiments that still incorporate these teachings.

What is claimed is:

1. Apparatus for evaluating a bitstream having a plurality of packets, where the packets carry time-elements, said apparatus comprising:
  a buffer for receiving one or more of the plurality of packets;
  a counter, coupled to said buffer, for recording a plurality of timestamps for the received packets, where each of said timestamps records a reception time of one of said packets;
  a processor, couple to said buffer, for evaluating the time-elements carried by said packets by using said timestamps from said counter; and
  a memory coupled to said processor, for storing said plurality of timestamps simultaneously from said counter.

2. The apparatus of claim 1, wherein said processor evaluates said time-elements in real time.

3. The apparatus of claim 1, further comprises:
  an interrupt controller, coupled to said counter, for sending an interrupt to said processor, to indicate that a new timestamp has been recorded by said counter.

4. The apparatus of claim 1, further comprises:
  a buffer controller, coupled to said buffer, for controlling said buffer in response to a control signal from said processor.

5. The apparatus of claim 1, wherein each of said timestamp records a reception time of a beginning of one of said packets.

6. The apparatus of claim 5, wherein said processor analyzes said time-elements to detect a Program Clock Reference (PCR) jitter.

7. The apparatus of claim 5, wherein said processor analyzes said time-elements to detect a PCR gap.

8. The apparatus of claim 5, wherein said processor analyzes said time-elements to detect a PCR discontinuity.

9. The apparatus of claim 5, wherein said processor analyzes said time-elements to detect an inter-arrival time of Service Information (SI).

10. Method for evaluating a bitstream having a plurality of packets, where the packets carry time-elements, said method comprising the step of:
  a) receiving one or more of the plurality of packets into a buffer;
  b) recording a plurality of timestamps for said received packets, where each of said timestamps records a reception time of one of said packets;
  c) using a processor to evaluate the time-elements carried by said packets by using said timestamps; and
  d) simultaneously storing said plurality of timestamps into a memory.

11. The method of claim 10, wherein said evaluating said time-elements step (c) is performed in real time.

12. The method of claim 10, wherein said storing step (d) stores said plurality of timestamps into a table in said memory.

13. The method of claim 10, further comprising the step of:
  (b') sending an interrupt to said processor to indicate that a new timestamp has been recorded.

14. The method of claim 10, wherein each of said timestamp records a reception time of a beginning of one of said packets.

15. The method of claim 14, wherein said processor analyzes said time-elements to detect a Program Clock Reference (PCR) jitter.

16. The method of claim 14, wherein said processor analyzes said time-elements to detect a PCR gap.

17. The method of claim 14, wherein said processor analyzes said time-elements to detect a PCR discontinuity.

18. The method of claim 14, wherein said processor analyzes said time-elements to detect an inter-arrival time of Service Information (SI).

19. A decoding system for decoding and evaluating a bitstream having a plurality of packets, where the packets carry time-elements, said decoding system comprising:

a decoder; and a bitstream analyzer, coupled to said decoder, wherein said bitstream analyzer comprises:

a buffer for receiving one or more of the plurality of packets;

a counter, coupled to said buffer, for recording a plurality of timestamps for the received packets, where each of said timestamps records a reception tune of one of said packets;

a processor, coupled to said buffer, for evaluating the time-elements carried by said packets by using said timestamps from said counter; and a memory, coupled said processor, for storing said plurality of timestamps simultaneously from said counter.

20. A computer-readable medium having stored thereon a plurality of instructions, the plurality of instructions including instructions which, when executed by a processor, cause the processor to perform the steps comprising of:

a) receiving one or more of the plurality of packets into a buffer;

b) recording a plurality of timestamps for said received packets, where each of said timestamps records a reception time of one of said packets;

c) using a processor to evaluate the time-elements carried by said packets by using said timestamps; and d) simultaneously storing said plurality of timestamps into a memory.

21. The computer-readable medium of claim 20, wherein said evaluating said time-elements step (c) is performed in real time.

22. The computer-readable medium of claim 20, wherein said storing step (d) stores said plurality of timestamps into a table in said memory.

23. The computer-readable medium of claim 20, further comprising the step of:

(b') sending an interrupt to said processor to indicate that a new timestamp has been recorded.

24. The computer-readable medium of claim 20, wherein each of said timestamp records a reception time of a beginning of one of said packets.

25. The computer-readable medium of claim 24, wherein said processor analyzes said time-elements to detect a Program Clock Reference (PCR) jitter.

26. The computer-readable medium of claim 24, wherein said processor analyzes said time-elements to detect a PCR gap.

27. The computer-readable medium of claim 24, wherein said processor analyzes said time-elements to detect a PCR discontinuity.

28. The computer-readable medium of claim 24, wherein said processor analyzes said time-elements to detect an inter-arrival time of Service Information (SI).

* * * * *